United States Patent
Becker et al.

(10) Patent No.: US 8,843,096 B2
(45) Date of Patent: Sep. 23, 2014

(54) MULTI-ANTENNA SYSTEM

(71) Applicant: Harman Becker Automotive Systems GmbH, Karlsbad (DE)

(72) Inventors: Karl-Anton Becker, Karlsbad (DE); Achim Ratzel, Karlsbad (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 13/870,594

(22) Filed: Apr. 25, 2013

(65) Prior Publication Data

US 2013/0288632 A1    Oct. 31, 2013

(30) Foreign Application Priority Data

Apr. 26, 2012   (EP) .................................... 12165712

(51) Int. Cl.
*H04B 1/06*       (2006.01)
*H04B 1/18*       (2006.01)
*H04B 1/00*       (2006.01)
*H01Q 21/30*      (2006.01)
*H04B 1/10*       (2006.01)

(52) U.S. Cl.
CPC ................. *H04B 1/18* (2013.01); *H04B 1/0064* (2013.01); *H01Q 21/30* (2013.01)
USPC ........................................ 455/277.1; 455/132

(58) Field of Classification Search
CPC ...................................................... H04W 88/06
USPC ........................ 455/132–137, 277.1–277.2, 455/552.1–553.1, 562.1
See application file for complete search history.

(56) References Cited

U.S. PATENT DOCUMENTS

| | | |
|---|---|---|
| 5,649,308 A | 7/1997 | Andrews |
| 7,277,056 B1 | 10/2007 | Thiam et al. |
| 2004/0116084 A1 | 6/2004 | Ward et al. |
| 2006/0116097 A1 | 6/2006 | Thompson |
| 2006/0145884 A1 | 7/2006 | Graham et al. |
| 2006/0205369 A1 | 9/2006 | Schaich et al. |
| 2007/0152675 A1 | 7/2007 | Thole et al. |
| 2010/0074370 A1 | 3/2010 | Gerlach et al. |

FOREIGN PATENT DOCUMENTS

| | | |
|---|---|---|
| DE | 4130608 C1 | 8/1992 |
| WO | 2011026522 A1 | 3/2011 |

OTHER PUBLICATIONS

European Search Report for corresponding Application No. 12165712.6, mailed Oct. 4, 2012, 7 pages.

*Primary Examiner* — Lee Nguyen
(74) *Attorney, Agent, or Firm* — Brooks Kushman, P.C.

(57) ABSTRACT

An antenna system is disclosed which includes a frontend portion, a backend portion, a feed line for connecting the frontend portion and the backend portion with each other, and a control unit for controlling the frontend portion and/or backend portion. The frontend portion includes multiple antennas that supply antenna signals and at least one combiner network that connects the antennas to the feed line. The backend portion includes multiple receivers and at least one splitter network that connects the feed line to the receivers. The control unit is configured to evaluate the reception quality and adjust the at least one combiner network and/or splitter network dependent on the reception quality. The at least one combiner network combines the signals from at least two antennas in different, non-overlapping frequency ranges to form at least one combined signal thereof.

19 Claims, 2 Drawing Sheets

MULTI-ANTENNA SYSTEM

CROSS-REFERENCE TO RELATED APPLICATIONS

This application claims priority to EP Application No. 12 165 712.6-2411 filed on Apr. 26, 2012, the disclosure of which is incorporated in its entirety by reference herein.

TECHNICAL FIELD

This invention relates to radio frequency antennas, specifically to a multiple antenna system which is capable of operating in multiple frequency ranges.

BACKGROUND

An antenna is usually connected to a transmitter or receiver by way of a feed line. Antennas for use at radio frequencies are effective over a limited frequency range. When operation is required over a wide frequency range it is common to use multiple antennas with each antenna optimized for a specific narrow band of frequencies. However, in such an antenna system for each antenna an individual feed line is to be provided so that such a system is costly, room consuming and heavy and, thus, less suitable for automotive applications.

Also common are systems in which multiple (active) antennas are connected to multiple receivers and/or transmitters via a single feed line. Signals of multiple antennas operated in different frequency ranges are combined by way of cross-over networks that superimpose signals in different frequency ranges to provide a broadband signal on a single feed line (e.g., multi-standard antenna systems), and signals of multiple antennas operated in the same frequency range (e.g., antenna diversity systems) are combined in a weighted fashion to provide an optimized signal in the particular frequency range which is to be transferred via the single feed line. However, if multi-standard antenna systems are arranged in a vehicle, in which usually receiving conditions vary strongly, the frequency response of the crossover networks may be either mismatched to the off air channel or the receiver may overloaded to the effect that the signals received are disturbed or the crossover networks produce too much noise due to little signal amplitudes.

Thus, there is a need to provide a multi-standard antenna/receiver system that overcomes the above-mentioned drawbacks.

SUMMARY

An antenna system is disclosed herein which includes a frontend portion, a backend portion, a feed line for connecting the frontend portion and the backend portion with each other, and a control unit for controlling the frontend and/or the backend portion. The frontend portion includes multiple antennas that provide antenna signals and at least one combiner network that connects the antennas to the feed line. The backend portion includes multiple receivers and at least one splitter network that connects the feed line to the receivers. The control unit is configured to evaluate the reception quality and adjust the at least one combiner and/or splitter network dependent on the reception quality. The at least one combiner network combines the signals from at least two antennas in different, non-overlapping frequency ranges to form at least one combined signal thereof.

BRIEF DESCRIPTION OF THE DRAWINGS

Various specific embodiments are described in more detail below based on the exemplary embodiments shown in the figures of the drawing. Unless stated otherwise, similar or identical components are labeled in all of the figures with the same reference numbers.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
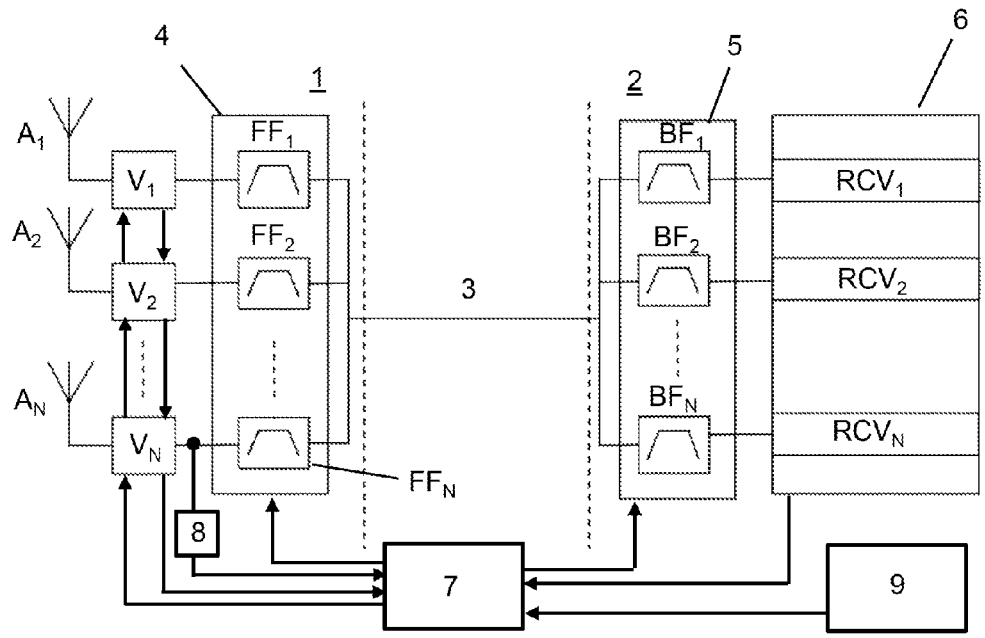
FIG. 1 is a block diagram illustrating an improved multi-standard system that includes a frontend portion and a backend portion connected by one feed line.

Referring to FIG. 1, an exemplary improved multi-standard antenna system, (i.e., a multi-band), that includes a frontend portion 1 and a backend portion 2 that are connected with each other via a feed line 3 (e.g., a co-axial cable). The frontend portion 1 includes N antennas $A_1, A_2 \ldots A_N$ each of which being optimized for a specific frequency band and antenna amplifiers $V_1, V_2 \ldots V_N$ each of which being connected between one of the N antennas and a combiner network (e.g., a crossover network) 4. The crossover network 4 may include N bandpass filters $FF_1, FF_2 \ldots FF_N$ that are connected downstream of the antenna amplifiers $V_1, V_2 \ldots V_N$ and whose outputs are connected with each other to form an output of the crossover network 4 that is connected to the feed line 3. The frontend portion 1 may be arranged at, for example, at a rear window of an automobile.

The backend portion 2 includes a splitter network (e.g., crossover network) 5 that may have N bandpass filters $BF_1, BF_2 \ldots BF_N$ whose inputs are connected with each other to form an input of the crossover network 5 that is connected to the feed line 3. The outputs of the bandpass filters $BF_1, BF_2 \ldots BF_N$ are connected to N receiving paths established by receivers $RCV_1, RCV_2 \ldots RCV_N$ that may be at least one of, for example, AM/FM, DAB, TV, DVB, CMMB and/or satellite receivers and that form part of a multi-standard receiver block 6. The backend portion 2 may be arranged in, for example, a head unit for automobiles.

A control unit 7 may be arranged in the frontend portion 1, the backend portion 2 or elsewhere, is connected to the antenna amplifiers $V_1, V_2 \ldots V_N$ and/or the bandpass filters $FF_1, FF_2 \ldots FF_N$ and/or the bandpass filters $BF_1, BF_2 \ldots BF_N$ in order to control the same in at least one of, for example, gain and bias point, frequency range, insertion loss, band stop attenuation and bandwidth. The control unit 7 may evaluate information provided by the multi-standard receiver block 6 or a dedicated evaluation circuit 8 that provides information based on own measurements performed on signals from the antennas $A_1, A_2 \ldots A_N$ and/or the antenna amplifiers $V_1, V_2 \ldots V_N$. Such information may be signal strength, band power, noise level, or the like.

Alternatively or additionally, further information may be such as Global Positioning Sensors (GPS) from a GPS sensor 9, broadcast information services such as the Radio Data System (RDS) or the Radio Broadcast Data System (RBDS), broadcast station maps etc. from the receivers $RCV_1$, $RCV_2 \ldots RCV_N$ which may also supply information to the control unit 7 that represents, for example, the level of the signals received by the receivers $RCV_1, RCV_2 \ldots RCV_N$, the receiver standard, channel frequency, adjacent-channel interference channel noise level and/or the like. From the information received from any one or more of the antenna amplifiers $V_1, V_2 \ldots V_N$, the bandpass filters $FF_1, FF_2 \ldots FF_N$ ($BF_1$, $BF_2 \ldots BF_N$), the receivers $RCV_1, RCV_2 \ldots RCV_N$, the dedicated evaluation circuitry 8, and the sensors 9, the control unit 7 generates control signals to control the antenna amplifiers $V_1, V_2 \ldots V_N$ and/or the bandpass filters $FF_1, FF_2 \ldots FF_N$ and, as the case may be of the bandpass filters $BF_1, BF_2 \ldots BF_N$ in order to adjust one or more of the bias point, the gain of the antenna amplifiers $V_1, V_2 \ldots V_N$, and/or the gain, the frequency range, the bandwidth, the insertion loss, and the stop band attenuation of the bandpass filters $FF_1, FF_2 \ldots FF_N$ and/or $BF_1, BF_2 \ldots BF_N$.

For instance, if the level of the signals to be received by one of the antennas $A_1, A_2 \ldots A_N$ is low, the bias point of the corresponding one of the antenna amplifiers $V_1, V_2 \ldots V_N$, is adjusted in a manner that the noise produced by the amplifier is reduced. If the levels of the signals to be received by one of the antennas $A_1, A_2 \ldots A_N$ are too high or disturbing signals are received at a high level, the gain of the respective antenna amplifier $V_1, V_2 \ldots V_N$ may be reduced or the bandpass filters $FF_1, FF_2 \ldots FF_N$ and/or $BF_1, BF_2 \ldots BF_N$ may be tuned due to one or more of a change in the frequency range, in the bandwidth, the insertion loss, and the stop band attenuation.

Figure 2:
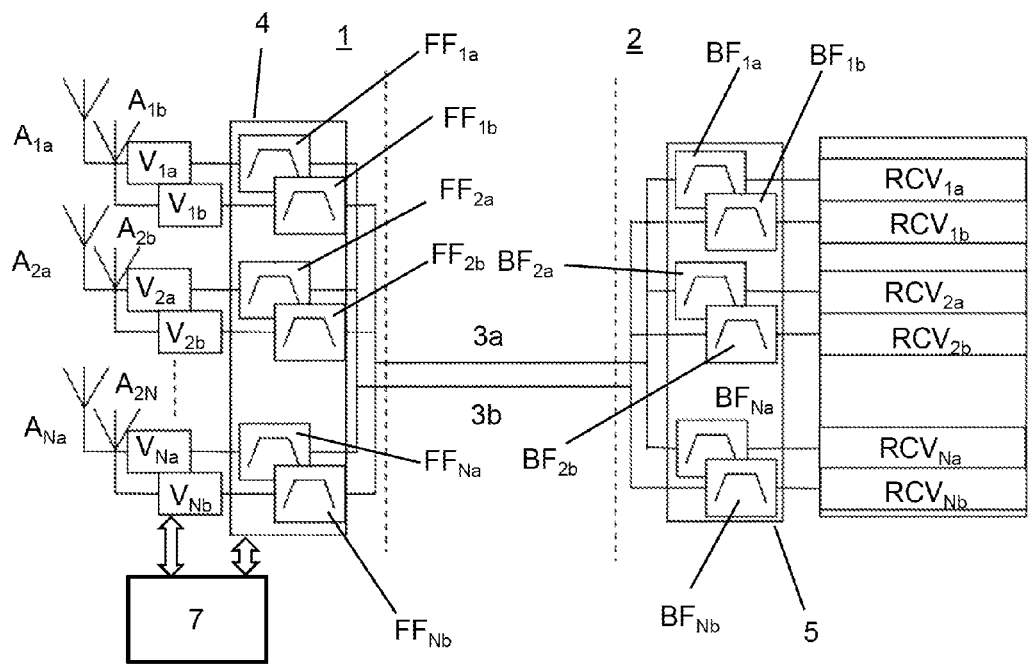
FIG. 2 is a block diagram illustrating another improved multi-standard antenna diversity system that includes a frontend portion and a backend portion connected by two feed lines.

In many situations it may be necessary to provide two (identical) antennas in the same frequency range (for the same standard) with, may be, different directivity. In such a case, both antennas may be evaluated and both may be controlled dependent on the assessment of one or more of the respective antenna, the amplifier, the bandpass filter, and the receiver. Referring now to FIG. 2, N pairs of antennas $A_{1a}, A_{2a} \ldots A_{Na}$, $A_{1b}, A_{2b} \ldots A_{Nb}$ and N pairs of amplifiers $V_{1a}, V_{2a} \ldots V_{Na}$; $V_{1b}, V_{2b} \ldots V_{Nb}$ are coupled via corresponding pairs of bandpass filters $FF_{1a}, FF_{2a} \ldots FF_{Na}$ and $FF_{1b}, FF_{2b} \ldots FF_{Nb}$ in the frontend portion 1 and a pair of feed lines 3a and 3b with corresponding pairs of bandpass filters $BF_{1a}, BF_{2a} \ldots BF_{Na}$ and $BF_{1b}, BF_{2b} \ldots BF_{Nb}$ arranged in the backend portion 2.

The cross-over networks 4 and 5 are connected upstream and downstream of the feed lines 3a and 3b. Pairs of receivers $RCV_{1a}, RCV_{2a} \ldots RCV_{Na}$; $RCV_{1b}, RCV_{2b} \ldots RCV_{Nb}$ are connected downstream of the pairs of filters $BF_{1a}, BF_{2a} \ldots BF_{Na}$ and $BF_{1b}, BF_{2b} \ldots BF_{Nb}$ of the backend portion 2.

With a multiple standard system as described above with reference to FIG. 2, antenna diversity can be provided. In the exemplary system shown, for each of the N individual frequency ranges double antenna diversity is provided by using two identical antennas with be may different directivities and subsequent receiving paths in the frontend portion 1 and the backend portion 2 for each frequency range.

Figure 3:
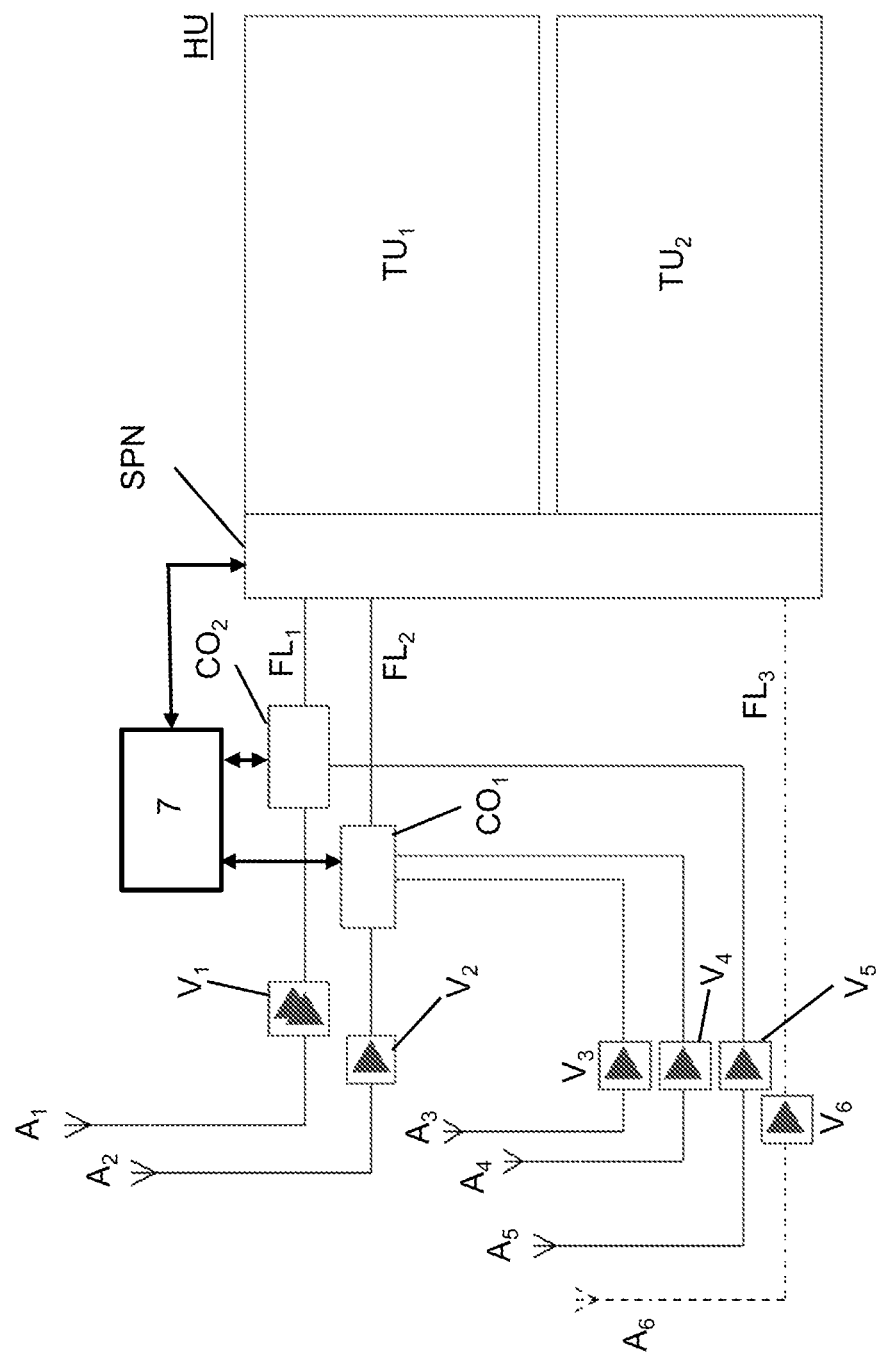
FIG. 3 is a block diagram illustrating still another improved multi-standard antenna diversity system that includes a frontend portion and a backend portion connected by two or three feedlines.

However, systems with partial antenna diversity may also be provided as described below with reference to FIG. 3. The system includes a combined FM/AM antenna $A_1$, an FM antenna $A_2$, a DAB-L band antenna $A_3$, a first TV–III+IV+V band antenna $A_4$, a second TV-III+IV+V band antenna $A_5$ and a third TV–III+IV+V band antenna $A_6$. Connected downstream of each of the antennas $A_1 \ldots A_6$ are antenna amplifiers $V_1 \ldots V_6$, in which amplifier $A_6$ is a combined FM/AM amplifier, amplifier $V_3$ is an DAB-L band amplifier and amplifiers $V_4, V_5, V_6$ are TV–III+IV+V band amplifiers. Antenna $A_6$ and amplifier $V_6$ may be option-al and may serve as, e.g., a backup system for TV band III+IV+V if one of antennas $A_4, A_5$ or their corresponding amplifiers $V_4, V_5$ do not sufficiently or not at all operate or as a third diversity antenna in combination with antennas $A_4, A_5$ and corresponding amplifiers $V_4, V_5$. For the FM broadcast band another diversity system is provided by way of the antennas $A_1$ and $A_2$ and the corresponding amplifiers $V_1, V_2$.

The individual frequency ranges AM, FM, DAB-L, TV–III+IV+V are non-overlapping. The outputs of amplifiers $V_1$ and $V_5$ are combined in a combiner $CO_1$ to a single combined output signal that is transferred to a head unit HU via a feed line $FL_1$. The outputs of amplifiers $V_2, V_3$ and $V_4$ are combined (e.g., superimposed) in a combiner $CO_2$ to a single combined output signal that is transferred to the head unit HU via a feed line $FL_2$. The combiners $CO_1, CO_2$ may be crossover networks if the amplifiers $A_1 \ldots A_6$ have essentially no impact on the frequency characteristic of the signals to be amplified. Alternatively, all amplifiers $A_1 \ldots A_6$ may be operated only in a specified frequency range so that they additionally serve as bandpass filters. In this case, the combiners $CO_1, CO_2$ may simply be signal adders or the like. The head unit HU may include a triple FM/AM Tuner $TU_1$ with phase diversity and a dual/triple multi-standard tuner $TU_2$ with maximum ratio combining (MRC) technology. A splitter network SPN connects the splitter network SPN to the feedlines $FL_1, FL_2, (FL_3)$.

With a system according to the invention it is possible to connect, for example, two multi-standard receivers by way of only two feedlines to a multiplicity of antennas of a (partial) diversity system without causing any signal overdrive and large-signal problems. Thus, even in an antenna diversity system with a plurality of antennas the backend portion needs to be connected only by a small number of feedlines, for example 2 (or 3), and, accordingly, a small number of connectors are necessary so that the costs are kept small as well as room and weight is saved. This is achieved in that one or more of the frequency range, the bandwidth, the insertion loss, the stop band attenuation of the bandpass filters, and the gain of the amplifiers is controlled in order to address the receiving situation at a certain location. The control unit assesses the reception quality by evaluating information originating from the frontend portion, the backend portion or other arrangements including sensors, memories, wireless connections, etc. The control of the bandpass filters and/or the amplifiers may be adaptive to match their frequency response to the off air channel.

Although various examples of realizing the invention have been disclosed, it will be apparent to those skilled in the art that various changes and modifications can be made which will achieve some of the advantages of the invention with-out departing from the spirit and scope of the invention. It will be obvious to those reasonably skilled in the art that other components performing the same functions may be suitably substituted. Such modifications to the inventive concept are intended to be covered by the appended claims.

What is claimed is:

1. An antenna system comprising a frontend portion, a backend portion, a feed line for connecting frontend portion and backend portion with each other, and a control unit for controlling at least one of the frontend portion and the backend portion, in which:
  the frontend portion comprises multiple antennas that supply antenna signals and at least one combiner network that connects the antennas to the feed line;

the backend portion comprises multiple receivers and at least one splitter network that connects the feed line to the receivers;

the control unit is configured to evaluate reception quality and to adjust the at least one combiner network and the splitter network dependent on the reception quality; and the at least one combiner network combines the signals from at least two antennas in different, non-overlapping frequency ranges to form at least one combined signal thereof, wherein the control unit is configured to evaluate information provided by the multiple receivers in order to assess the reception quality.

2. The system of claim 1, in which the at least one combiner network comprises at least one of a signal adder and at least one bandpass filter.

3. The system of claim 1, in which amplifiers having a bias point and a gain are connected downstream of the multiple antennas and the control unit is configured to adjust at least one of a bias point and a gain of each of the amplifiers.

4. The system of claim 1, in which the control unit is configured to evaluate information provided by at least one of amplifiers, bandpass filters and dedicated evaluation circuitry in order to evaluate the reception quality.

5. The system of claim 4, in which the information provided to the control unit by the at least one of the amplifiers and the bandpass filters comprise one of signal amplitude, amplifier gain, bandpass gain, bandpass frequency range, noise level, and adjacent-channel interference.

6. The system of claim 1, in which the information provided to the control unit by the receivers comprise one of level of the signals received by the multiple receivers, a receiver standard, a channel frequency, adjacent-channel interference, and a channel noise level.

7. The system of claim 1, in which the control unit is configured to evaluate information provided by at least one of a sensor and a memory.

8. The system of claim 7, in which the information provided to the control unit by the at least one of the sensor and the memory comprises one of a global position of receivers, broadcast locations, and broadcasted signal strength.

9. The system of claim 1 further comprising combiners and/or splitters that are configured to be controlled for at least one of an insertion loss, stop band attenuation, a bandwidth and frequency range(s).

10. The system of claim 1, in which at least one of the multiple receivers is a multi-standard receiver.

11. The system of claim 1, in which at least one additional feed line is connected between the fronted portion and the backend portion.

12. The system of claim 1, in which the control unit is not used and a plurality of bandpass filters in a combiner/splitter have fix insertion loss, stop band attenuation, frequency and bandwidth for mobile receiving conditions.

13. An antenna system comprising:
a front end portion including:
multiple antennas that supplies antenna signals; and
at least one combiner network that connects the multiple antennas to a feed line;
a backend portion including:
multiple receivers; and
at least one splitter network that connects the feed line to the multiple receivers; and
a control unit is configured to evaluate reception quality and to adjust the at least one combiner network and the splitter network dependent on the reception quality,
wherein the at least one combiner network combines the signals from at least two antennas in different, non-overlapping frequency ranges to form at least one combined signal thereof, and
wherein the control unit is configured to evaluate information provided by the multiple receivers in order to assess the reception quality.

14. The system of claim 13, in which the at least one combiner network comprises at least one of a signal adder and at least one bandpass filter.

15. The system of claim 13, in which amplifiers having a bias point and a gain are connected downstream of the multiple antennas and the control unit is configured to adjust at least one of a bias point and a gain of each of the amplifiers.

16. The system of claim 13, in which the control unit is configured to evaluate information provided by at least one of amplifiers, bandpass filters and dedicated evaluation circuitry in order to evaluate the reception quality.

17. The system of claim 16, in which the information provided to the control unit by the at least one of the amplifiers and the bandpass filters comprise one of signal amplitude, amplifier gain, bandpass gain, bandpass frequency range, noise level, and adjacent-channel interference.

18. The system of claim 13 further comprising combiners and/or splitters that are configured to be controlled for at least one of an insertion loss, stop band attenuation, a bandwidth and frequency range(s).

19. An antenna system comprising:
a front end portion including:
multiple antennas that supplies antenna signals; and
at least one combiner network that connects the multiple antennas to a feed line;
a backend portion including:
multiple receivers; and
at least one splitter network that connects the feed line to the multiple receivers; and
a control unit configured to evaluate reception quality and adjust the at least one combiner network and the splitter network based on the reception quality;
wherein the at least one combiner network combines at least a portion of the antenna signals from at least two antennas in different, non-overlapping frequency ranges to form at least one combined signal thereof, and
wherein the control unit is configured to evaluate information provided by the multiple receivers in order to assess the reception quality.

* * * * *